June 20, 1933.   C. H. NORTON   1,914,578
SIZE INDICATING STEADY REST
Filed March 14, 1928   3 Sheets-Sheet 1

Inventor
Charles H. Norton
By Clayton R. Jenks
Attorney

June 20, 1933.　　　C. H. NORTON　　　1,914,578
SIZE INDICATING STEADY REST
Filed March 14, 1928　　　3 Sheets-Sheet 2

Inventor
Charles H. Norton
By Clayton R. Jenkes
Attorney

Patented June 20, 1933

1,914,578

UNITED STATES PATENT OFFICE

CHARLES H. NORTON, OF PLAINVILLE, CONNECTICUT, ASSIGNOR TO NORTON COMPANY, OF WORCESTER, MASSACHUSETTS, A CORPORATION OF MASSACHUSETTS

SIZE INDICATING STEADY REST

Application filed March 14, 1928. Serial No. 261,473.

The present invention relates to steady rests and more particularly to a size indicating steady rest for cylindrical grinding machines.

In accordance with approved grinding practice, cylindrical grinding machines are provided with steady rests for supporting the work in its rotation in order to maintain the axis thereof in correct relation to the grinding wheel. It has been proposed heretofore to measure the work size by means of an indicator actuated by a steady rest shoe, which is automatically advanced as the work is reduced in size. That these previous attempts have failed may be attributed to the inability to successfully balance the massive movable parts of the steady rest with sufficient delicacy to give precise readings within the desired degree of accuracy.

The principal object of the present invention is therefore to produce a cylindrical grinding machine in which the work may be measured automatically in a precise manner.

To the accomplishment of this object, it is proposed to provide in a cylindrical grinding machine having a grinding wheel and a work supporting table and a steady rest shoe for supporting the work, means independent of the shoe, for measuring the work at the point of operation.

The means for measuring the work may have a single work engaging member to indicate the reduction in size of the work by the grinding wheel at any stage of the grinding operation. As the thickness of the material removed is very small, it is preferred to employ calipers, independent of the shoes, to measure the diameter of the work during the grinding operation. The feelers of the calipers may be light and sensitive and may be maintained automatically upon the work during its reduction in diameter.

It is also preferred to multiply the relative movement of the feelers in calipering the work and to indicate said movement on a dial placed in the view of the operator. Preferably, the determinations of the feeler are transferred from the point of operation adjacent to the wheel to the front of the machine so that the dial may be conveniently located for observation by the operator.

Another object of the present invention is to provide a steady rest having a pair of work steadying shoes, separately adjustable means to initially position the shoes, and a single manual adjustment whereby the shoes are simultaneously adjusted during the grinding operation.

Further features of the present invention consist in certain devices, combinations and arrangements of parts tending to improve and simplify the operation of grinding machines and enable them to operate with certainty and without liability of breakage of parts. The advantages of these devices, combinations and arrangements of parts will be obvious to those skilled in the art from the following description.

The various features of the present invention will be explained in connection with the accompanying drawings, illustrating one form of the invention, on which, Fig. 1 is a side elevation showing the steady rest and indicating mechanism in the position they assume when the work is being inserted into or removed from the work supporting table, with the grinding wheel being shown diagrammatically;

Figure 1:
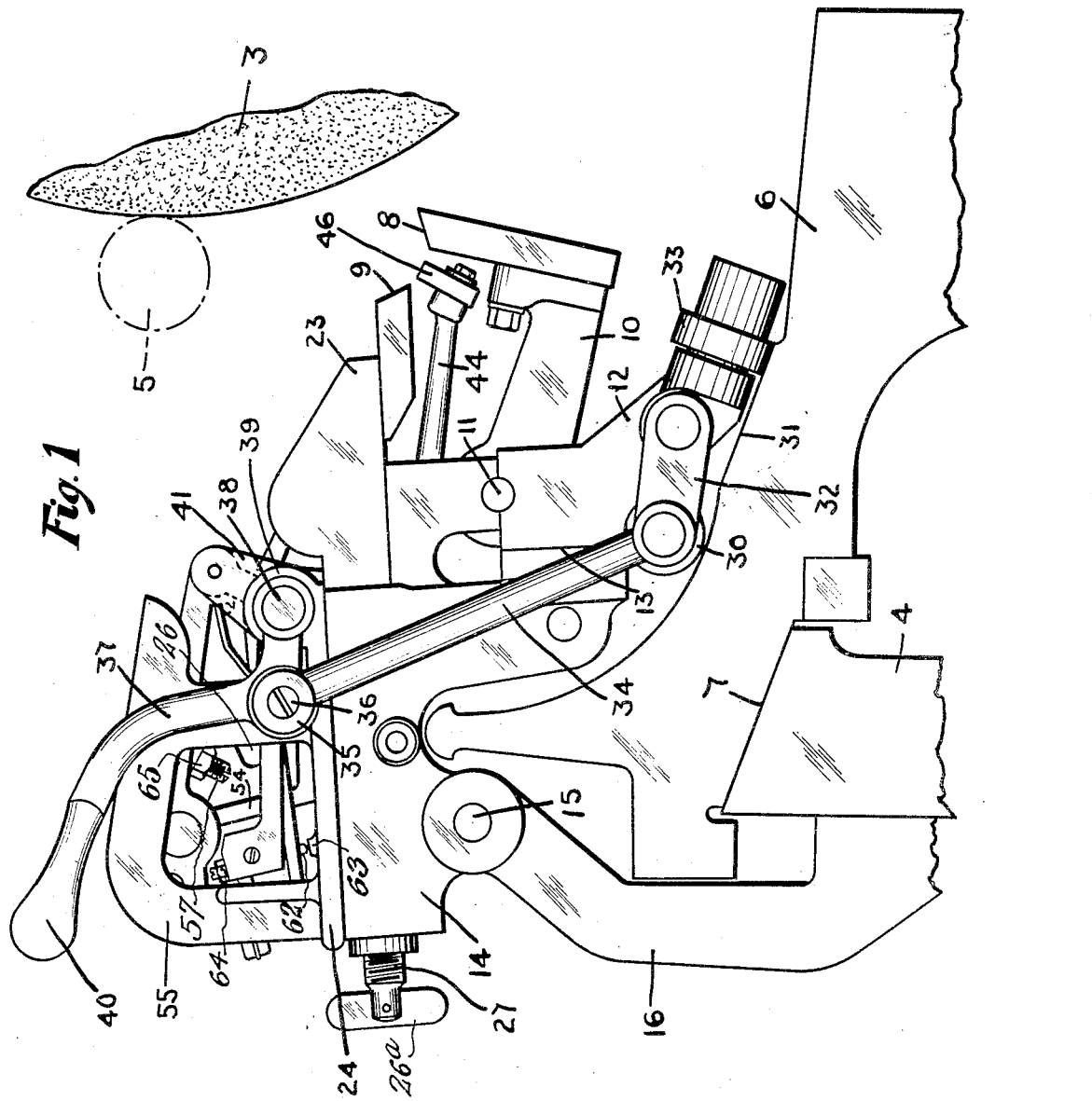

In accordance with this invention, one embodiment is illustrated in the drawings which is particularly adapted for grinding crankshafts and the like having a plurality of portions to be ground to a predetermined size but in which there is no relative traverse between the work and wheel during grinding. As shown in the drawings, the steady rest member is pivotally mounted on the base of the machine so that the steady rest shoes and the gaging feelers contact, at all times, with the work at a point opposite the grinding wheel. In the grinding of crankshafts and the like where it is necessary to grind one portion of the shaft and then relatively move the shaft and grinding wheel to position another portion of the shaft in operative relation with the grinding wheel, it is desirable to have some form of steadying mechanism which may be readily disengaged from the work to permit longitudinal movement of the work and then engaged to continue the grinding operation on another portion of the shaft. As illustrated, the mechanism is provided with a manually operable means by which the steady rest member and feelers may be readily brought into operative contact with a portion of the work before grinding and then be readily removed therefrom to permit traverse of the table after grinding. While the drawings disclose this invention as applied to a machine of the above type, it should be noted that the invention is equally applicable to traverse grinding in which the work supporting table and grinding wheel are reciprocated relative to each other during the grinding operation.

In the illustrated embodiment of the invention, a grinding wheel 3 is mounted to rotate in a single vertical plane relative to a stationary base 4 in a manner well understood by those skilled in the art. The work 5 is supported, in the usual manner, in head and foot stocks (not shown) which are fastened to a work supporting table 6 mounted to slide in a direction parallel to the axis of the grinding wheel upon ways 7 formed on the base 4. In this type of cylindrical grinding machine, the work table is constructed to traverse the work in a longitudinal direction past the grinding wheel 3.

In order to steady the work at the point opposite the grinding wheel, the machine is provided with a pair of steady rest shoes 8 and 9, which engage with the work in accordance with approved grinding practice. The shoe 8 is secured to a massive arm 10 pivotally mounted on a stud 11 between the arms of a yoke 12. The yoke 12 is secured to a flat face 13 depending from a yoked steady rest support 14, the arms of which are pivotally and loosely mounted upon a stud 15 carried by a bracket 16 secured to the base 4.

The steady shoe arm 10 is provided with a projection 17, (Fig. 2) which is engaged by the lower end of an adjusting screw 18 having threaded engagement in a tube 19 integral with an arm 20 pivoted at 21 between the arms of the support 14. The upper end of the arm 20 is housed within an opening 22 in a slide 23 which is mounted to slide in ways formed between the arms of the support 14. The slide 23 is covered by a plate 24, secure to the upper surface of the support 14. The plate 24 is provided with an opening 25 through which extends the upper end of the adjusting screw 18. This portion of the screw 18 is provided with an operating handle 26 by which the screw 18 may be rotated in the tube 19 to adjust the initial operating position of the shoe 8.

Figure 2:
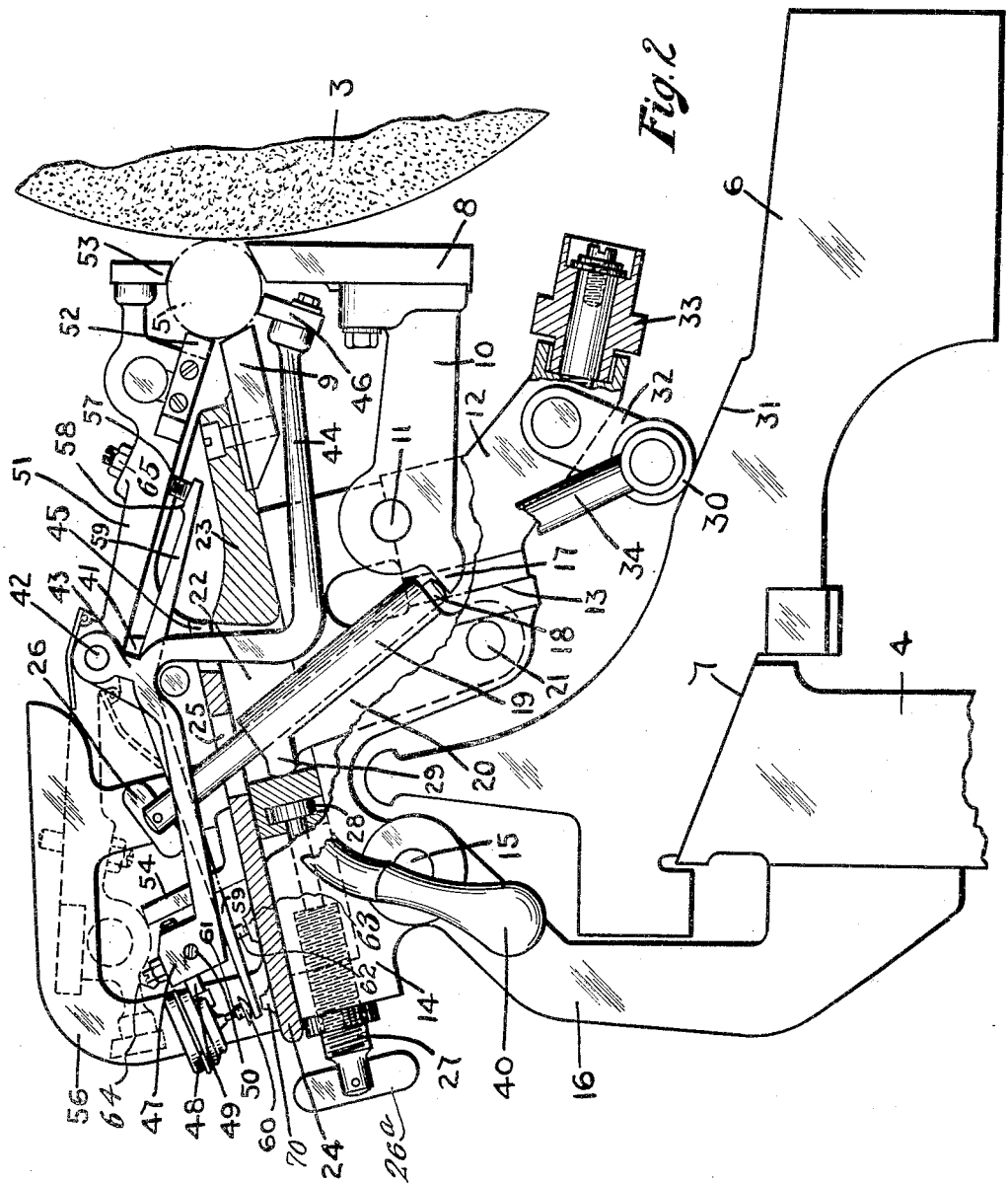
Fig. 2 is a side elevation, partly in section with the parts in the position they assume during the grinding operation.
Figure 4:
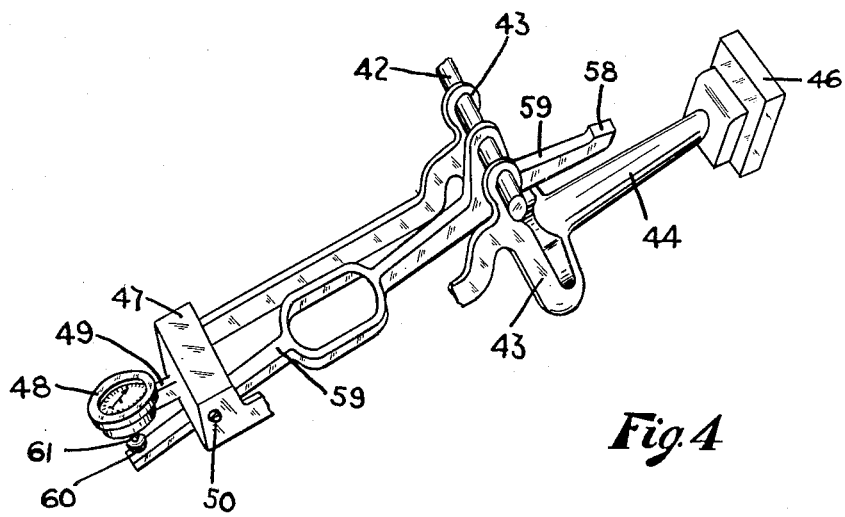
Fig. 4 is a fragmentary perspective view of the feeler levers of the indicating mechanism.
Figure 3:
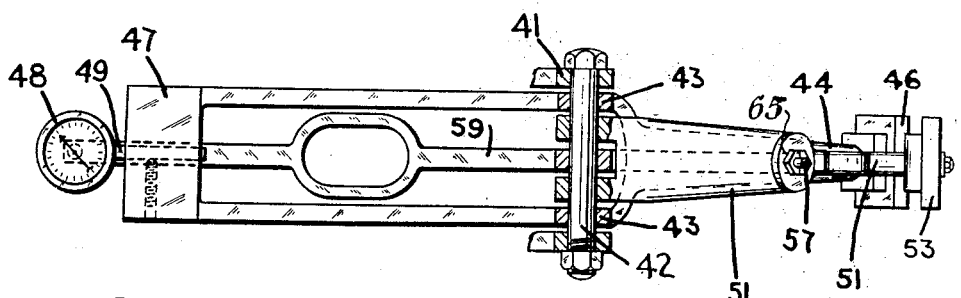
Fig. 3 is a fragmentary view partly in section illustrating the mounting of the feeler levers of the indicating mechanism.

The steady rest shoe 9 is secured to the outer end of the slide 23 which at this end is massive as shown particularly in Fig. 1. The position of the slide 23 may be adjusted by an adjusting screw 27 which is threaded into the support 14 and which is provided with a cylindrical head 28 rotatably mounted in the slide 23. As shown in Fig. 2 the portion of the slide 23 within which the head 28 is housed engages a lug 29 on the arm 20 and swings it in a clockwise direction on its pivot 21 thus causing the screw 18 to actuate the arm 10 through contact with the projection 17.

With this construction the steady rest shoes may be engaged with the work in accordance with approved grinding practice, first by manipulation of the operating head 26a which actuates the screw 27 to feed the slide 23 to bring the shoe 9 into engagement with the work. The steady rest shoe 8 is then adjusted into engagement with the work through manipulation of the screw 18 to swing the arm 10 on its pivot to bring the shoe into engagement with the work. After the shoes 8 and 9 are in contact with the work they may be moved simultaneously to maintain them in contact with the work while its diameter is being reduced by the grinding operation through the manipulation of the screw 27 alone.

In order to swing the steady rest support 14 upwardly about its pivot 15 and thus elevate the steady rest shoes 8 and 9 from the inoperative position of Fig. 1 into an operative position as shown in Fig. 2 in which the roller 30 is engaged with the supporting surface 31, and to swing the support 14 to withdraw the steady rest shoes 8 and 9 from their operating position to facilitate the insertion of the work into and its removal from the machine in which the roller 30 is raised from the supporting surface 31 and the roll 33 is engaged therewith, the link 32 is connected to the lower end of a rod 34 (Fig. 1). The upper end of the rod 34 is provided with a yoke 35, the arms of which embrace a pin 36 which forms a pivot for a bell-crank lever 37. The horizontal arm of the bell-crank lever is pivoted on a stud 38 secured to a pair of ears 39 rising from the opposite sides of the plate 24. The vertical arm of the bell-crank lever 37 is provided with an operating handle 40.

The horizontal arm of the bell-crank lever 37 and the rod 34 in effect form a toggle.

The toggle is made and broken through the movement of the handle 40. When the toggle is made, the roller 30 is engaged with the supporting surface 31, the roll 33 is raised from said surface and the steady rest shoes 8 and 9 are elevated into their operating position, (Fig. 2). When the toggle is broken the roller 30 is raised from the surface 31, the roll 33 is engaged with the surface 31 and the steady rest shoes are lowered to an inoperative position, (Fig. 1).

In order to measure the work at the point of operation the stud 38 carries a pair of arms 41 which support a pivot pin 42 between them at their upper ends. Pivotally mounted on this pin 42 is a pair of arms of a yoked-lever 43 having a bent arm 44 which passes downwardly through an opening 45 in the plate 24 and the opening 22 in the slide 23 and which carries on its outer end a feeler 46 engaged with the work between the steady rest shoes 8 and 9. The other end of the lever 43 is provided with a block 47 to which an indicator 48 is connected by a pin 49 held in position by a screw 50. As shown in Fig. 2 the dial 48 is mounted in an inclined position just above the operating screw 27 so that the operator may see the dial while operating the screw.

Embraced by the arms of the yoke-lever 43 and pivoted on the pin 42 is a yoked-arm 51 carrying on its rear end a pair of feelers 52 and 53. By mounting the lever 44 and the arm 51 on the same pivotal support the feelers 46, 52 and 53 all occupy an operating position in the same vertical plane which passes through the shoes 8 and 9 and the plane of operation of the grinding wheel. The arm 51 may be swung, from its operative position as shown in full lines in Fig. 2 to the dotted position therein, to facilitate the insertion of the work into and is removal from the machine. In its inoperative position the arm 51 is supported by a foot 54 secured to the plate 24 in which position the feelers 52 and 53 are protected from injury by a pair of wings 55 (Fig. 1) and 56 (Fig. 2) upstanding from the plate 24.

In order to indicate the diameter of the work calipered by the feelers upon the dial of the indicator 48 the arm 51 carries an adjustable screw 57, the end of which bears against a flat surface 58 formed on the rear end of a lever 59 pivoted on the pin 42 between the arms of the yoked-lever 51. The front end of the lever 59 engages a button 60 on the stem 61 of the dial 48 which operates the dial pointer. The front arm of the lever 59 is provided with an opening through which the operating handle 26 of the screw 18 extends.

Normally, the front end of the lever 59 rests upon a lug 70 on the plate 24 as the front arm of the lever 59 is longer than its rear arm. When the feelers 46, 52 and 53 first engage the work, the diameter of which is to be reduced by the grinding wheel, the front end of the lever 59 rests upon the lug 70 and the surface 58 is disengaged from the screw 57. As the diameter of the work is reduced by the grinding wheel, the feelers 52 and 53 maintain their contact with the work under the influence of gravity. The feeler 46 is also maintained in contact with the work by the weight of the block 47 and indicator 48 on the front end of the lever 59. The feelers thus relatively approach automatically during the grinding operation. During this relative approaching movement of the feelers the screw 57 engages the surface 58 and elevates the front end of the lever 59 into engagement with the button 60 thus operating the dial to indicate the diameter of work at the point of operation.

It will be apparent from an inspection of Fig. 2 that the movement of the stem 61 of the dial is obtained both from an upward movement of the front end of the lever 59 and a downward movement of the indicator itself. The resultant of these two relative approaching movements of the front end of the levers 44 and 59 operate the pointer of the dial to indicate the diameter of the work at the point of operation. Usually the indicator is set initially to a number above zero when the feelers first engage the work, then, as the diameter of the work is gradually reduced by the grinding wheel, the pointer on the work travels toward the zero reading.

An adjustable stop screw 62 is screw threaded into the block 47 and is adapted to contact with a lug 63 on the plate 24 to limit the downward movement block 47 when the work is interchanged. The screw 62 is locked in any position of adjustment by a lock nut 64. This adjustment of the screw 63 is made so that when the work is ground to finished size there is a slight clearance between the screw 62 and the lug 63. It is readily apparent from this construction that when the work is removed from operative position, the weight of the block 47 swings the lever 44 until the screw 62 contacts with lug 63 thereby preventing upward movement of the feeler 46. The screw 57 is locked in its desired position of adjustment by a nut 65.

In operating the steady rest, the work is centered in the head and foot stocks while the parts associated with the steady rest are in the positions shown in Fig. 1. After the work is positioned in the machine, the handle 40 is depressed from the position of Fig. 1 to that of Fig. 2 to elevate the shoes 8 and 9 and place the roller 30 into firm engagement with the surface 31 of the work supporting table 6. The screw 27 is then manipulated to slide the shoe 9 into engagement with the work after which the handle 26 is rotated to turn the screw 18 and thereby engage the shoe 8 with the work (Fig. 2). The feelers 52 and 53 which are shown in the dotted position of Fig. 2 are swung into the full line or operative position to engage them with the work. The screw 57 is now adjusted to set the indicating mechanism for the particular size or kind of work engaged by the feelers.

The grinding wheel is then thrown into operation. During the grinding, the screw 27 is manipulated to maintain the shoes 8 and 9 in contact with the surface of the work as it diminishes in diameter. The feelers 46, 52 and 53 maintain their engagement with the diminishing work by gravity. When the pointer on the indicator points to zero on the dial, the relative approaching movement of the work and the grinding wheel is stopped by the operator, who rotates the feeding mechanism to remove the grinding wheel from operative contact with the work. The lever 51 is then swung to an inoperative position as shown in dotted lines in Fig. 2. The operator then raises the handle 40 which moves the roller 30 from the surface 31 and swings the support 14 into an inoperative position such as shown in Fig. 1. In this position the roll 33 is brought into contact with the surface 31 and the operator may traverse the work table 6 to bring another portion of the work piece in operative relation with the grinding wheel, whereupon the handle 40 is again depressed and lever 51 swung to an operative position to support and gage the new portion of the work during grinding.

Nothing herein explained is to be interpreted as limiting the invention in the scope of its application to use in connection with the particular type of grinding machine or the particular mode of operation thereof or both selected for purposes of illustration and explanation. While the particulars of construction herein set forth are well suited to one mechanical form of the invention, it is not limited to these details of construction, not to the conjoint use of all its features, nor is it to be understood that these particulars are essential since they may be variously modified through the skill of the artisan without departing from the true scope of the actual invention, characterizing features of which are set forth in the following claims by the intentional use of generic terms and expressions inclusive of various modifications.

Having thus described my invention, what I claim as new and desire to secure by Letters Patent is:

1. A steady rest for grinding machines comprising a frame, two steady rest shoes adjustably mounted on said frame to engage and support the work, and a measuring device supported on said frame having an indicator and a contact member engaging the work between the shoes so that the work may be measured during grinding independently of the operation of the shoes.

2. A steady rest for a grinding machine having a work support, comprising a frame, two work steadying shoes adjustably mounted thereon, means for moving the shoes out of contact with the work, an indicating device having a contact member engageable with the work between the shoes to indicate the size of the work during grinding and means whereby said contact member may be moved out of contact with the work independently of movement of the shoes.

3. A cylindrical grinding machine comprising a base, a rotatable grinding wheel, a slidable work supporting table, a steady rest having work engaging shoes, a support for said rest fixed to the base and arranged to maintain the rest in a position opposed to the grinding wheel irrespective of the position of said table, and a work measuring device mounted on said rest having contact members engaging the same portion of the work engaged by the shoes which indicates the size of the work during grinding.

4. A grinding machine comprising a rotatable grinding wheel, a work support, a steady rest having a work engaging shoe, means to adjust said shoe relative to said work, a movable support for said steady rest arranged to permit moving the rest to and from an operating position, and a gauging device mounted on said rest having a contact member engageable with the same portion of the work which is engaged by the work shoe and operating independently thereof to indicate the size of the work.

5. A steady rest comprising a frame, two work steadying shoes, a support for the shoes whereby they may be moved quickly away from an operative position, means for finely positioning the shoes relative to a work piece, a work measuring device including an indicator and a contact member, and means including a pivotal support whereby the contact member may be withdrawn to permit removal of the shoes from their operative position.

6. A grinding machine comprising a base, a rotatable grinding wheel, a work supporting table slidably mounted on the base, a steady rest having a pair of independently adjustable work steadying shoes, a pivotal support for said steady rest on the base arranged to support the rest either in an operative position with the shoes in engagement with the work or in an inoperative position with the rest engaging a portion of the work table, and manual means to swing the rest into either position.

7. A grinding machine comprising a base, a work supporting table slidably mounted on the base and having a supporting surface, a steady rest having an adjustable work steadying shoe, a pivotal support for the rest mounted on the base, and a roller on the rest engaging said surface and cooperating with said pivotal support to support the rest during sliding movement of the table.

8. A grinding machine comprising a base, a work supporting table slidably mounted on the base and having a supporting surface, a steady rest having an adjustable work steadying shoe, a pivotal support for the rest mounted on the base, a roller on the rest cooperating with said pivotal support to support the rest during sliding movement of the table, and means for moving the roller into and out of contact with the supporting surface.

9. A grinding machine comprising a base, a work supporting table slidably mounted on the base, a supporting surface on said table, a steady rest having an adjustable work steadying shoe, a pivotal support for the rest on the base, a follower on the rest cooperating with said pivotal support to support the rest during sliding movement of the table, a second follower on said rest, and manually operable means to move the second follower relative to said surface and thereby move the shoe into operative position relative to the work.

10. A cylindrical grinding machine having, in combination, a base, a grinding wheel rotatably mounted thereon, a work supporting table slidably mounted on the base to traverse the work past the wheel, a steady rest pivoted on the base and provided with two independent devices engaged with the table for supporting the steady rest during the grinding operation and during the traverse of the table, respectively, and means for alternately engaging said devices with the table.

11. A steady rest having means for calipering the work comprising a feeler, a pivoted arm therefor, a second feeler, a pivoted lever therefor, a second pivoted lever, adjustable connections carried by the arm and the first pivoted lever, respectively, for engaging one end of the second pivoted lever, and an indicator on the end of the first pivoted lever engaging the other end of the second pivoted lever to indicate the reduction in size of the work.

Signed at Plainville, Connecticut, this 10th day of March, 1928.

CHARLES H. NORTON.